No. 627,972. Patented July 4, 1899.
J. F. BRADY.
MEANS FOR RESTORING AIR PRESSURE IN PNEUMATIC TIRES.
(Application filed Nov. 17, 1898.)
(No Model.)
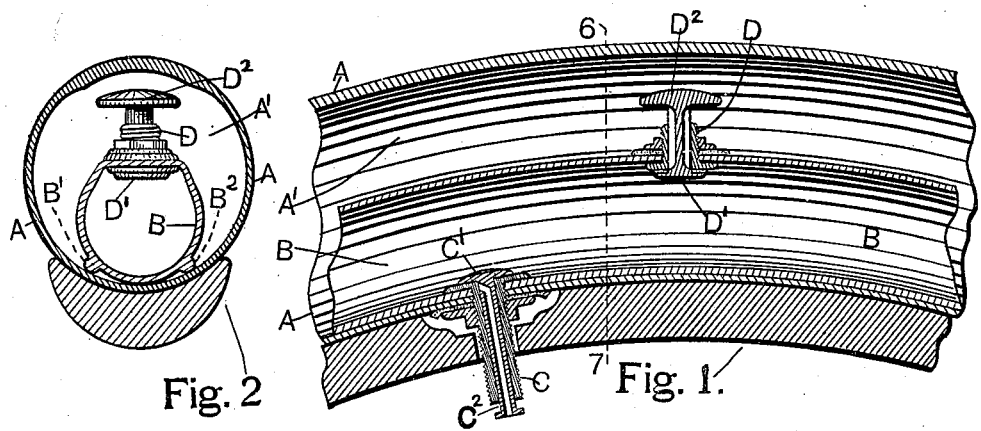
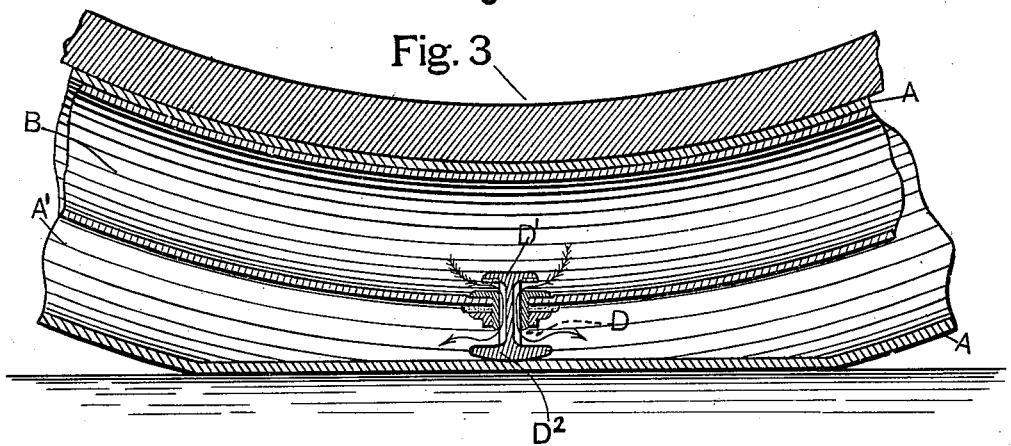
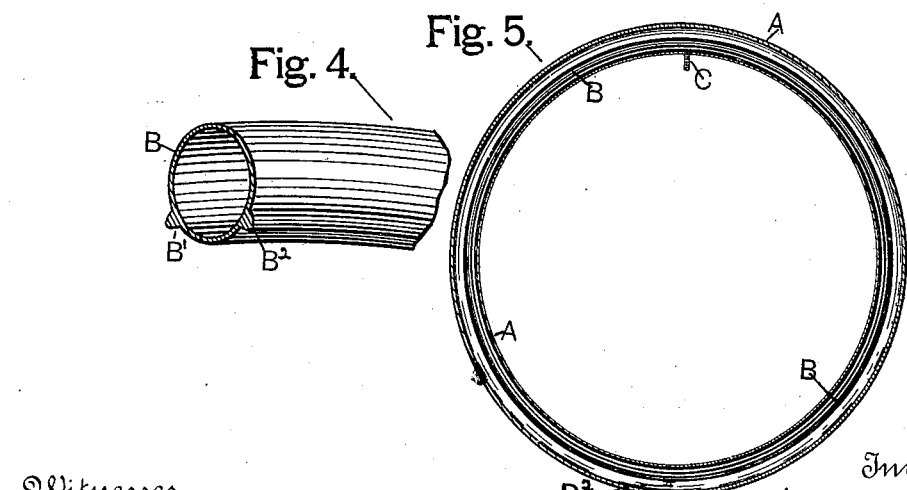
Witnesses
Edward J. McCarty
H. L. Brown
Inventor
John F. Brady
By Oscar Snell
his Attorney

UNITED STATES PATENT OFFICE.

JOHN F. BRADY, OF CHICAGO, ILLINOIS.

MEANS FOR RESTORING AIR-PRESSURE IN PNEUMATIC TIRES.

SPECIFICATION forming part of Letters Patent No. 627,972, dated July 4, 1899.

Application filed November 17, 1898. Serial No. 696,694. (No model.)

*To all whom it may concern:*

Be it known that I, JOHN F. BRADY, a citizen of the United States, residing at Chicago, in the county of Cook and State of Illinois, have invented a new and useful Means for Restoring Air-Pressure in Pneumatic Tires for Vehicle-Wheels, of which the following is a specification.

My invention relates to means for restoring air-pressure caused by leakage in pneumatic tires for vehicle-wheels; and one object is to construct a hollow tire which serves as a cushion-chamber and having connected therewith a chamber or reservoir in which air is stored under a much higher pressure than is necessary or practical for use as a cushion in pneumatic tires of an ordinary strength and size.

Still another object is attained by placing the high-pressure chamber within the cushion-chamber of the tire, so as to relieve the walls of the pressure-chamber of part of the internal pressure of air by the counter-pressure within the cushion-chamber and also by preventing all leakages of air through the walls of the high-pressure chamber from passing directly into the atmosphere, as is hereinafter fully described, and illustrated by the accompanying drawings, in which—

Figure 1 is a vertical longitudinal section through a portion of a vehicle-wheel rim and a portion of a pneumatic tire mounted thereon and a high-pressure tubular chamber within the cushion-chamber of the tire, together with valves which guard passage-ways leading from the outside into the high-pressure chamber and thence into the cushion-chamber. Fig. 2 is a cross-section on broken line 6 7, Fig. 1. Fig. 3 is the same section of the tire as Fig. 1, but showing only the passage-way and valve between the high-pressure and cushion chambers to illustrate manner of opening the valve by the pressure of the vehicle-wheel upon the surface of the roadway. Fig. 4 is a perspective view of a portion of the high-pressure tubular chamber and showing a cross-section to illustrate position of longitudinal ridges adapted to prevent the chamber from turning over laterally when disposed within the cushion-chamber. Fig. 5 is a vertical section through the walls of the cushion-chamber on a smaller scale than the other figures and shows relative position of the high-pressure chamber in elevation.

Similar letters indicate like parts in all the views.

The main body of the tire A is made of the usual tubular form and of flexible materials, the hollow portion forming the usual cushion-chamber containing air under pressure. Within the cushion-chamber is the high-pressure tubular chamber B, which is preferably in contact with the inner portion of the wall of the cushion-chamber and is held from turning laterally by means of the longitudinal ridges B' and B².

At C is a tube having the inner end portion secured to and through the walls of both the cushion and high-pressure chambers, and through this tube and valve-stem C² is a passage-way leading into the high-pressure chamber and is guarded by an inwardly-opening valve C'.

At D is another tube attached at one end portion to and through the walls of the high-pressure tube-chamber, and through tube D is a passage-way leading from the high-pressure chamber into the cushion-chamber A' and is guarded by a valve D', which opens into the cushion-chamber. The valve-stem of valve D' terminates in a head D², which is adapted to being contacted by the inside surface of the cushion-chamber A' to open valve D' by the pressure of the tire upon the roadway.

In practice the high-pressure chamber is usually made of such materials and construction that it may withstand a pressure several times greater to the square inch than the tire proper, which forms the walls in this instance of the cushion-chamber, which latter is of larger diameter and therefore has a greater extent of surface than the high-pressure chamber.

The cushion-chamber A' is inflated by attaching the tube C to some source of air-supply under pressure, then holding the valve D' open by pressing upon the tread-face of the tire over head D² of the valve D' with the fingers or, as shown in Fig. 2, in contact with the ground, when air may pass from the high-pressure chamber into the cushion-chamber through valve-tube D until sufficient air has been introduced to form the desired cushion, when the pressure on valve D' is removed to permit it to close, after which the pressure is raised in high-pressure chamber B to several times the pressure in the cushion-chamber and is prevented from returning to the source of supply by valve C'.

It is understood that the cushion-chamber is filled with air in the first instance at such a pressure that the weight of the rider will not compress the wall of the tire at the tread sufficiently to contact the valve-stem head $D^2$, so that no air can pass into the cushion-chamber from the high-pressure chamber unless by loss from leakage past the valve or through the walls of the chamber. Should the pressure of air be lowered to some undesirable amount in the cushion-chamber, the weight on the wheel would cause the tread portion of the wall of the cushion-chamber to be pressed inwardly by contact with the roadway, as shown in Fig. 3, and valve D' be opened, when air will flow through tube D past valve D' until the cushion-chamber is distended sufficiently to prevent the opening of the valve, as described.

In all combinations of materials for pneumatic tires yet introduced if they have been inflated for a few hours or days, even when not being subjected to use on the road, the air-pressure is gradually reduced on account of the permeability of the wall of the cushion-chamber, which loss it is intended to replace by whatever air is leaked from the high-pressure chamber so long as the pressure therein is much higher than in the cushion-chamber.

I claim as my invention—

1. In a tire for vehicle-wheels having a pneumatic cushion-chamber, a second chamber within the cushion-chamber, and an air-supply within the second chamber at a higher pressure than in the cushion-chamber, and a passage-way for air connecting the two chambers with a valve adapted to admit air from the second chamber into the cushion-chamber by pressure thereon transmitted through the wall of the cushion-chamber, for the purpose stated.

2. A means for restoring air-pressure in pneumatic tires for vehicle-wheels, consisting of a second chamber containing air under pressure within the cushion-chamber of the tire, and having a passage-way for air leading into the cushion-chamber from the second chamber, and a valve guarding the passage-way which is operated by compressing the cushion-chamber in the manner and for the purpose substantially as stated.

JOHN F. BRADY.

Witnesses:
D. F. CRILLY,
GEORGE P. BUTTERLY.